Aug. 31, 1943.  V. WALKER  2,328,533
GLASS ARTICLES AND METHOD OF MANUFACTURE THEREOF
Filed Dec. 26, 1941  3 Sheets-Sheet 1

INVENTOR
VICTOR WALKER
BY
Bean, Brooks, Buckley + Bean.
ATTORNEYS

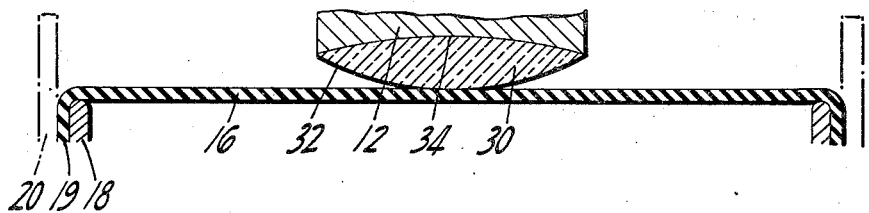
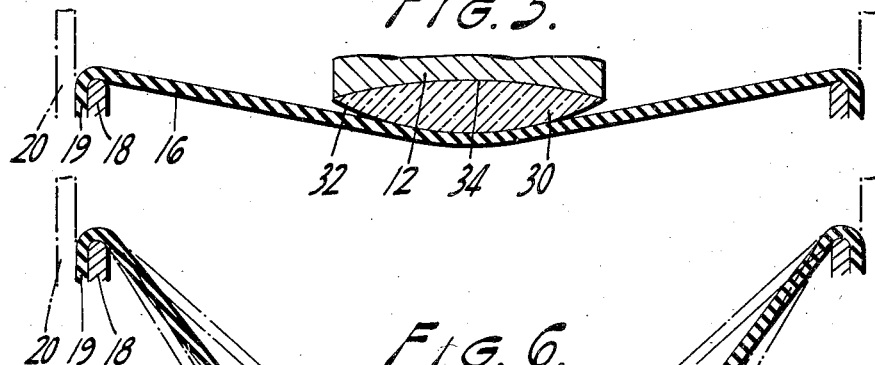
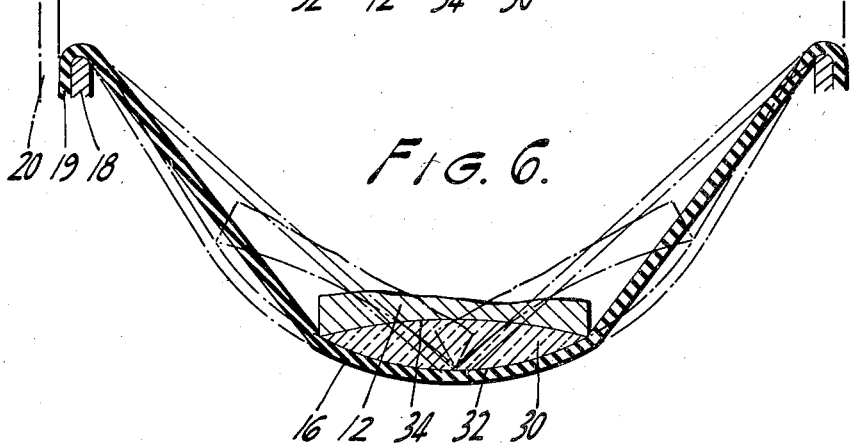
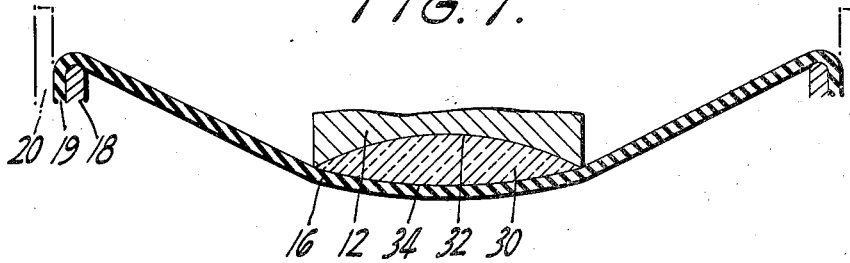

Aug. 31, 1943.  V. WALKER  2,328,533
GLASS ARTICLES AND METHOD OF MANUFACTURE THEREOF
Filed Dec. 26, 1941  3 Sheets-Sheet 3

INVENTOR
VICTOR WALKER
BY
Bean, Brooks, Buckley & Bean
ATTORNEYS

Patented Aug. 31, 1943

2,328,533

UNITED STATES PATENT OFFICE 2,328,533

GLASS ARTICLE AND METHOD OF MANUFACTURE THEREOF

Victor Walker, Fort Erie, Ontario, Canada, assignor to AlnCin, Inc., Buffalo, N. Y.

Application December 26, 1941, Serial No. 424,382

11 Claims. (Cl. 41—42)

This invention relates to the art of processing glass and other glass-like substances for the optical arts or other ornamental or industrial uses, and more particularly to improvements in apparatus and methods for shaping and finishing such materials into variously curved surface forms.

One of the objects of the present invention is to provide an improved apparatus and method for processing glass stock pieces whereby finished glass articles of curved surface form such as lenses or the like of improved light transmitting and other characteristics may be manufactured. Another object of the present invention is to provide an improved apparatus and method for the purpose aforesaid whereby substantial reductions in costs of manufacturing such articles may be effected. Another object of the present invention is to provide an improved apparatus and method for the purposes stated hereinabove, whereby glass or other crystalline or glass-like substance stock pieces may be processed to a large variety of curved surface forms with improved facility. Another object of the invention is to provide an improved apparatus which is particularly adapted to be quickly adjustable for processing curved surface portions of glass stock pieces having different degrees of curvature.

Another object of the invention is to provide an improved apparatus and method for the purpose of finally processing curved surface portions of stock pieces composed of glass or other light transmitting media such as are employed in connection with the production of optical instruments. Other objects and advantages of the invention will appear from the specification hereinafter.

In the drawings:

Figs. 4, 5, 6 and 7 are fragmentary views, on an enlarged scale, corresponding to Fig. 2 and showing various phases of the apparatus adjustment into lens blank processing condition;

Figure 1:
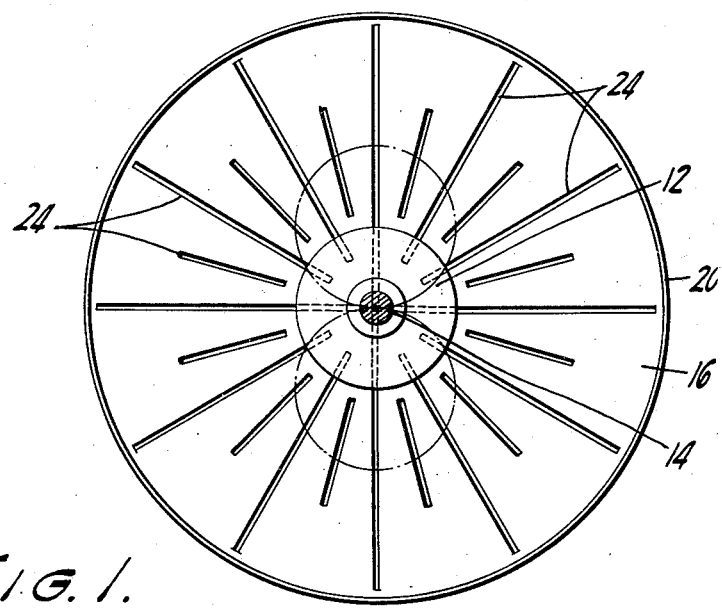
Fig. 1 is a top plan of a lens processing apparatus of the invention.
Figure 2:
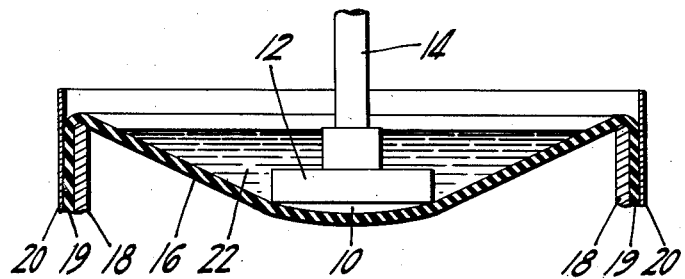
Fig. 2 is a fragmentary central vertical section therethrough.

Figs. 1 and 2 illustrate the apparatus and method of the invention in connection with the processing of a lens blank 10 which is mounted upon a block 12, as by temporary cementing pitch or the like as is customary in connection with the mounting of lens blanks upon rotating spindles in connection with conventional abrasion-type lens blank grinding and finishing processes. The mounting block 12 is fixed to one end of an actuating spindle 14, and the spindle 14 is arranged to be rotated axially and simultaneously oscillated about a pivot center located in the region of the center of curvature of the lens blank surface to be processed. It will be understood that the aforesaid rotation and oscillation of the spindle 14 may be readily attained through coupling the spindle to any suitable power supply and mounting mechanism, such as is well known in the conventional abrasion-type optical grinding and finishing arts. Consequently in the interest of simplifying the present drawings and specification the mounting and power supply mechanism of the spindle 14 is omitted from the drawings and will be referred to in no greater detail in the specification.

The method of processing of the present invention involves basically continuous wiping of the work piece surface in sliding pressure contact relation against the smooth surface of an elastic master implement while maintaining a film of suitable glass-reacting acid or reagent therebetween. The purpose of the reagent application to the glass stock piece is to provide reduction of the surface portion of the stock piece to regular form subsequent to elimination therefrom of the initial surface layer of the stock piece which inevitably includes imperfections. For example irrespective of the method by which the stock piece 10 has been initially provided and formed, as by either pressing or molding or grinding or chipping or the like, it is well known that the surface portions of the stock piece will invariably contain surface and sub-surface fractures, scale, foreign substance inclusions, heat-stress effects known as striae, and the like; whereby transmission of light through the stock piece will be effected.

It is well known that in connection with conventional glass processing methods the lens blanks or the like are subjected to successive steps of grinding and polishing by means of increasingly finer grades of abrasive materials, whereby the initial surface layers of the stock pieces are removed to obtain regularity of surface shape, and whereby surfaces of superficially polished appearance are provided. However, it is now known that glass surfaces so prepared are of modified structural and light transmissive form because of the effect of the grinding and polishing operations upon glass substance at the surface and therebelow. It has been proven beyond doubt that such prior art methods of abrasive polishing and finishing of glass surfaces inherently involve flowage of the glass structure to a substantial depth and modification thereof into amorphous state. In addition, the finished surface in such case is of highly polished form and of relatively high specular reflection characteristics.

The phenomenon of sub-surface flowage and of modification of the structural characteristics of the glass stock piece is recognized and explained, for example, in vol. XXXI No. 124 of the publication "Science Progress" published by G. I. Finch, London, England under date of April 1937, at pages 609-624 inclusive. In this article the modified sub-surface glass portion is referred to as "The Beilby layer" in honor of the scientist Sir George Beilby who studied the phenomenon and became known as the author of the theory on the subject. In this article it is authoritatively explained that glass surfaces that have been finished or otherwise processed through use of abrasion methods are of modified surface layer form, whereby the light diffraction and light transmission characteristics of the glass body are materially affected; and it is the primary object of the present invention to provide improved apparatus and means for processing and finishing glass surfaces of curved surface form in an improved manner and so as to be free of characteristics artificial to the native glass substance of the stock piece such as normally exist in the "Beilby layer" portions of glass articles which have been processed and finished by prior art methods.

In Figs. 1 and 2, the apparatus of the invention is illustrated as comprising an acid applying diaphragm 16 which may be conveniently provided in the form of a sheet of rubber or other suitable elastic and acid-resistant substance. In the drawings the diaphragm 16 is of circular plan form and is mounted at its edge portions so as to extend across the upper lip of a cylindrical cuff 18 which extends upwardly from any suitable base support (not shown). The diaphragm 16 is dimensioned so as to overlap the lip of the cuff 18, as at 19, and a clamping collar 20 is slip-fitted over the lapped portions 19 of the pad so as to clamp the latter firmly to the cuff 18. Thus, the collar 20 is fitted about the assembly to extend thereabove to complete the cup-like receptacle which is adapted to contain a supply of the acid composition, as indicated at 22, in substantially fluid-tight manner.

The work piece carrying spindle 14 is arranged to be movable toward and away from the acid receptacle so as to be adapted to bring the lens blank 10 into bearing relation against the diaphragm 16, as illustrated in Fig. 2; whereupon the lower surface of the lens blank will be brought into pressing contact against the diaphragm 16. It will of course be understood that the spindle 14 may be lowered relative to the acid receptacle portion of the apparatus to whatever degree is necessary to provide uniform contact between the lens blank lower surface and the diaphragm 16 throughout the entire extent of the lens blank contacting surface; and that oscillation of the spindle 14 will thereupon cause the lens blank to reciprocate in an orbit substantially concentric to the spherical curvature which is assumed by the diaphragm 16 in response to the pressure imposed thereon by the lens blank-spindle unit. Thus, as the spindle 14 is simultaneously oscillated and rotated the lower surface of the lens blank 10 will be both rotatably and slidably wiped against the elastic diaphragm 16 in such manner as to provide complete equalization of the effects of any inequalities in the surfaces of the diaphragm or of the lens blank. Preferably, the diaphragm-cuff assembly 16—18 will be simultaneously rotated about its vertical central axis to provide further equalization of the processing operation.

The blank contacting surface of the diaphragm 16 is preferably radially grooved as indicated at 24 so as to provide open channels or recesses leading into the upper surface portion of the diaphragm so as to assist in circulation and redistribution of the acid material between the contacting surface of the lens blank 10 and the diaphragm 16 throughout all stages of the lens blank moving operation. Thus, continuous replenishment of used portions of the acid supply is facilitated, and continued reaction between the lens blank surface and the acid composition will be assured.

The composition of the acid bath used in connection with the apparatus of the invention will depend upon the chemical and physical characteristics of the crystalline substance of the stock piece in any given case. For example, in connection with the processing of a soda-lime type glass or a so-called lead type glass, I employ an aqueous solution of hydrofluoric acid.

It appears that the hydrofluoric acid ingredient of the bath reacts with the silicate substance of the glass as to proceed progressively inwardly from the surface thereof to form silica fluoride salts. Thus, the structure of the glass stock piece is progressively reduced as the acid reaction continues, while at the same time the relative wiping movement of the diaphragm 16 against the same surface portion of the stock piece effectively controls the action of the acid in novel manner so as to provide reduction of the stock piece to perfectly regular form. This is because the diaphragm acts to immediately remove from relatively high portions of the lens blank the salt by-products of the reaction between the acid and the glass substance. Simultaneously, the diaphragm 16 will bring fresh acid supplies to the newly exposed high portions of the blank, whereby continuously fresh attacks by the acid composition upon the relatively high portions of the lens blank will be effected. On the other hand the salt by-products of the chemical reaction are allowed to deposit unmolested upon the surface of the lens blank at relatively recessed portions thereof where the master pad 16 is withheld from wiping contact thereagainst. Consequently, the continued relative movement between the lens blank and the elastic diaphragm provides continuous uncovering of the relatively high portions of the lens blank to the action of fresh acid while the relatively recessed portions thereof become masked from the acid action because of the acid-resisting qualities of the salt deposits referred to.

I have found as the result of many experiments that I prefer to employ in conjunction with the basic glass reactive acid referred to hereinabove, an acid action modifier ingredient for the purpose of facilitating progressive removal of the fluoride salt by-products from the glass stock piece by the action of the diaphragm 16. For example, in connection with processing of soda-lime glass or lead type glass by means of hydrofluoric acid solutions, as referred to hereinabove, I prefer to add to the acid bath sulphuric acid in such amount that the hydrofluoric acid and sulphuric acids are present in the bath in the ratio of about 1 to 5 respectively. When such a bath is employed it appears that the hydrofluoric acid ingredient initially reacts with the glass substance of the stock piece to form the fluoride salts thereof, and that the sulphuric acid ingredient of the bath thereupon reacts immediately with the fluoride salts to form sulfate salts which are relatively easy to wipe away from the stock piece. Thus, the wiping of the relatively high parts of the stock piece so as to be clear of salt by-products is greatly facilitated, and the progressive stock piece reduction process referred to is thereby permitted to take place in response to a minimum of wiping action of the diaphragm 16 against the stock piece. Consequently, the entire operation is facilitated and no substantial rubbing action against the stock piece surface by the diaphragm 16 is required to produce the desired effect. Thus, in accord with the method of the invention the relatively high portions of the stock piece are continuously reduced until a perfectly regular and unaltered surface of native glass is exposed, as the result solely of a controlled removal by acid of glass substance from the stock piece without substantial rubbing of the stock piece as in connection with conventional optical finishing methods.

By way of another example, to illustrate that the composition of the acid bath employed in connection with the apparatus will depend upon the characteristics of the stock piece in any given case, if the glass stock piece to be processed embodies a relatively high percentage of barium I find that the best results appear to be obtained through employment of an acid bath comprising an aqueous solution of hydrofluoric acid and phosphoric acid, in which the phosphoric acid ingredient may be present in proportion to the hydrofluoric acid ingredient in the ratio as high as 5 to 1, depending upon the barium content of the stock piece. As in the case of the soda-lime glass referred to hereinabove, it appears that the hydrofluoric acid ingredient of the bath reacts with the silica contents of the stock piece to provide reduction thereof as explained hereinabove, and that the diaphragm 16 is thereupon enabled to remove the salt by-products from the stock piece surface. However, it again appears that some modifier ingredient facilitates the operation of the processing method, and that either sulphuric acid or phosphoric acid may be employed for this purpose in connection with the hydrofluoric acid bath when processing barium type glasses. Therefore, if the barium content of the glass stock is relatively low the modifier ingredient of the basic hydrofluoric acid mixture will preferably comprise a mixture of phosphoric acid and sulphuric acid in which the sulphuric acid predominates; and as the barium content increases the phosphoric acid will be preferably correspondingly increased relative to the sulphuric acid.

It will be appreciated that the finished glass surface produced by the apparatus and method of the invention is therefore free of any surface layer modification effects, such as are inherently formed through use of abrasion-type finishing processes and referred to in the article concerning the "Beilby layer" cited hereinabove. The finished surface of the lens blank 10, after having been treated by the method of the present invention, is of unmodified native glass form, and is entirely free of specular reflection characteristics or other effects artificial to the characteristics of the native glass of the stock piece.

I have found as a result of many experiments in connection with the finishing of various types of curved glass surfaces that use of the freely flexible form of diaphragm 16 illustrated and described hereinabove is productive of superior results when compared to the methods and apparatus of the prior art. The improved effects referred to result from the fact that the flexible diaphragm is enabled to adapt itself to conform exactly to the contacting lens blank surface throughout the entire range of movement thereof in such manner as to provide absolutely uniform pressure therebetween at all stages of the operation and at all portions of the lens blank surfaces.

Figure 3:
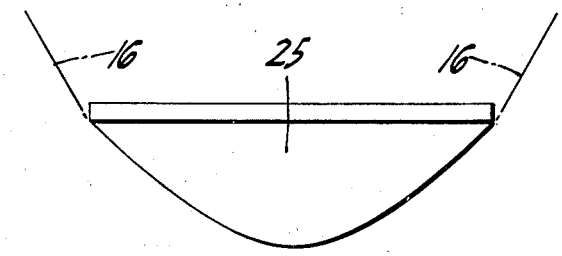
Fig. 3 is a fragmentary diagrammatic view, on an enlarged scale, corresponding to a portion of the apparatus of Fig. 2 and illustrating application of the invention to the processing of a non-spherical lens blank.

It will also be appreciated that the diaphragm 16 is readily adjustable so as to be adapted to process glass blank surfaces of various curvatures. For example, in Fig. 2 the lens blank 10 is illustrated as being of typical spherical lens form, but as illustrated in Fig. 3, a lens blank 25 having a parabolic curve surface may be processed by the method of the invention with equal facility by simply adjusting the diaphragm 16 relative to its supporting cuff device so that it will conform exactly to the curve of the lens blank with equal pressures against all contacting portions thereof.

Figs. 4 through 7 illustrate the mode of adjusting the diaphragm 16 to suit the apparatus of the invention to the processing of glass surfaces of different curvatures. Fig. 4 illustrates the shape and condition of the diaphragm prior to being elastically deformed by the pressing of a lens blank 30 thereagainst. The lens blank 30 is illustrated as having a lower surface of spherical curvature indicated at 32 and an upper spherical surface 34 of a relatively flatter curvature. Fig. 5 corresponds to Fig. 4 but illustrates an intermediate stage of adjustment of the lens blank relative to the diaphragm 16, as a result of partial lowering of the blank-carrying spindle against the diaphragm. It will be seen that in response to the spindle-directed pressure, the pad 16 stretches to complement the curved center portion of the lens blank and radiates therefrom so as to follow the shortest radial distances to the lip of the cuff device 18. Obviously under such conditions the area of contact between the lens blank and the diaphragm is limited to the center portion of the lens blank, and it will be understood that in this position of adjustment only the center contacting portion of the lens blank could be processed in accord with the method of the invention upon rotation and oscillation of the lens blank relative to the diaphragm in the presence of the acid composition, as explained hereinabove.

Fig. 6 corresponds to Figs. 4 and 5 but illustrates the lens blank 30 as having been adjusted relative to the diaphragm 16 for uniform processing of the entire under surface portion 32 of the lens blank. It will be seen that in this position of adjustment of the spindle-carried lens blank the blank has been pressed against the diaphragm 16 to a degree sufficient that the diaphragm is depressed and deformed into spherical form throughout the entire zone of its contact with the lens blank surface 32. From thence the diaphragm extends radially toward the lip portion of the cuff 18 so as to take the shortest distance in all directions therebetween.

Thus, it will be understood that the spindle-carried lens blank may be so adjusted relative to the diaphragm 16 that the contact between the diaphragm and every adjacent surface portion of the lens blank is under equal pressure. Therefore, as the diaphragm is rotated and the lens blank is rotated and oscillated, as explained hereinabove, there will be provided complete equalization of all wiping forces between the lens blank and the diaphragm.

It will be understood that the dimensional proportions of the lens blank and the diaphragm and the structural and elastic characteristics of the diaphragm, and the degree of pressure which has been predetermined to provide optimum acid controlling results in each case, will determine the nature of the adjustment of the lens blank and spindle relative to the diaphragm. For example, in some cases the diaphragm 16 may be permitted to remain fixed at the region of its connection with the cuff 18 throughout the stages of adjustment of the lens blank relative thereto as illustrated in Figures 4, 5 and 6. On the other hand, in many cases it will be found advisable in view of the relative dimensions of the lens blank and the cuff, and in view of the elasticity characteristics of the diaphragm, to arrange to adjust the mounting of the diaphragm upon the cuff 18.

For example, it may be found advisable to shift the marginal edge portions of the diaphragm relative to the cuff lip so that the body portion of the diaphragm will be initially relaxed, as distinguished from the taut condition thereof illustrated in Figure 4. Thus, subsequent lowering of the lens blank into position providing complete contact by the diaphragm over the entire under surface of the lens blank will involve reduced pressure forces between the lens blank and the diaphragm. Or, in some cases, it may be advisable to adjust the mounting of the diaphragm relative to the cuff 18 so as to be initially more taut, whereby upon adjustment of the lens blank into proper processing position the pressure forces between the lens blank and the diaphragm will be of increased order.

Thus, it will be understood that the apparatus of the invention is adjustable to provide perfect slide bearing contact between the diaphragm 16 and all portions of variously curved workpiece surfaces; and that the device is also readily adjustable so that the contact pressure forces between the work piece and the diaphragm may be regulated at will. During oscillation of the lens blank relative to the diaphragm subsequent to adjustment into proper processing position, it will be understood that the diaphragm will readily deform to accommodate the shifting of lens blank position relative thereto, and that due to the elastic nature of the diaphragm member the entire surface of the lens blank will nevertheless be at all times acted upon by the diaphragm with uniform contact pressure forces over the entire surface of the lens blank to be processed.

Figure 7 illustrates the adaptability of the apparatus of the invention to the processing of variously curved work pieces inasmuch as Figure 7 corresponds to Figure 6 but illustrates the position of adjustment of the apparatus for proper processing of the flatter curved surface portion 34 of the lens blank 30. Thus, for example, it will be understood that in the case of a double convex lens blank wherein the opposite faces are of different curvatures, as illustrated in Figures 4 to 7, the apparatus of the invention lends itself with great facility to the processing of both sides of the lens blank, by simply reversing the mounting of the lens blank upon the spindle block and readjusting the spindle-carried lens blank relative to the diaphragm, as explained hereinabove.

Figure 8:
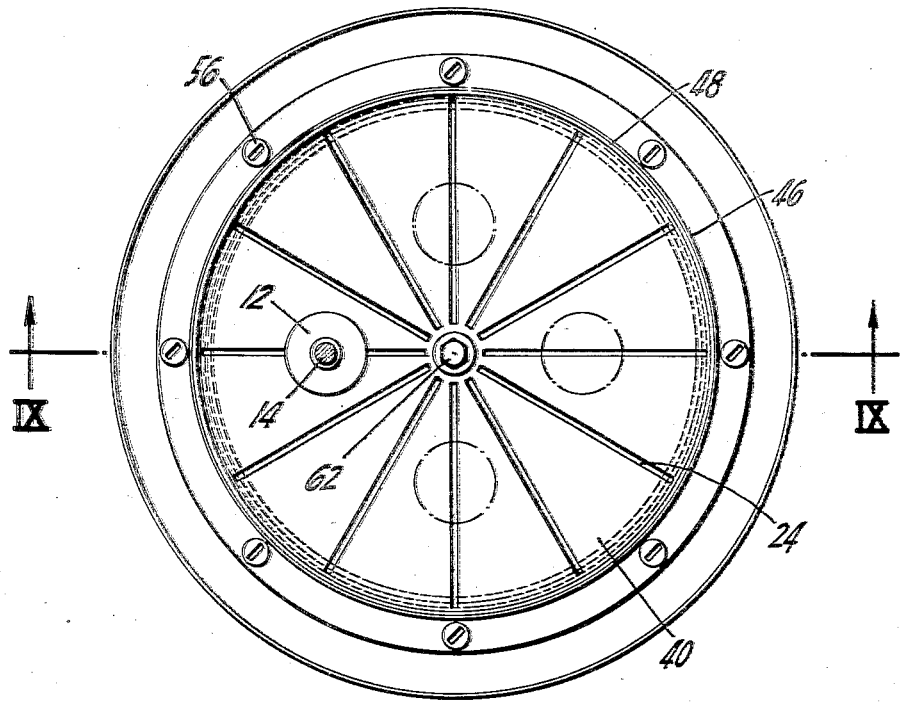
Fig. 8 is a top plan view similar to Fig. 1 of another form of the apparatus of the invention.
Figure 9:
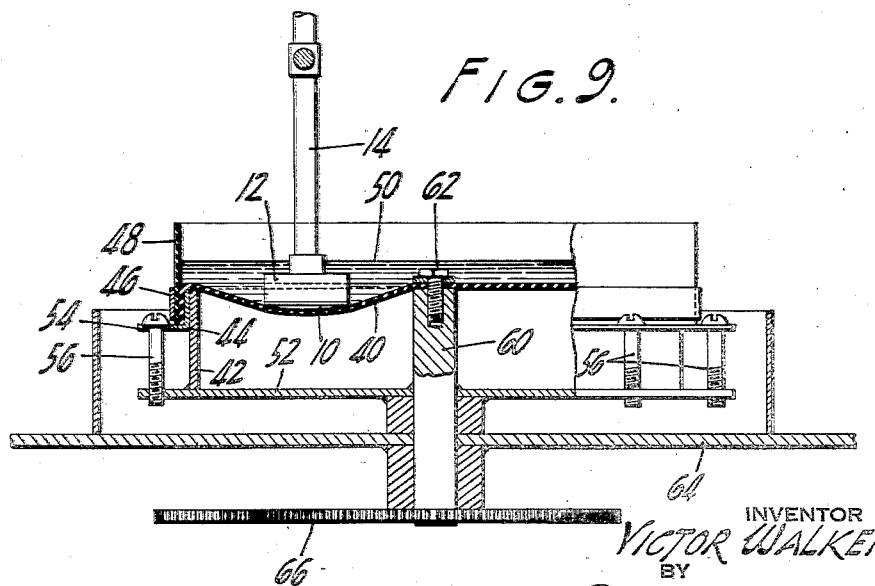
Fig. 9 is a fragmentary section taken substantially along IX—IX of Fig. 8.

It will of course be understood that any suitable means for mounting the diaphragm 16 so as to be adjustable in tension relative to the lip portion of the cuff 18 may be provided. For example, Figures 8 and 9 illustrate another form of apparatus of the invention wherein the diaphragm portion 40 thereof corresponds to the diaphragm 16 of Figures 1 to 7. In the apparatus of Figures 8 and 9, however, the diaphragm supporting cuff member is illustrated at 42 as having an annular flange 44 slidably mounted thereabout. The marginal edge portion of the diaphragm 40 is arranged to overlap the flange 44 and to be clamped thereagainst by means of a locking ring 46. A retaining ring 48 is also mounted between the locking ring 46 and the flange 44 to extend above the diaphragm to provide a cup-like structure for retaining the acid bath indicated at 50. The cuff 42 is fixed to extend vertically from a base plate 52; and radially extending lug portions 54 of the flange 44 are arranged to carry a plurality of screws 56 at intervals peripherally of the apparatus. The lower threaded end portions of the screws 56 are screw-threaded into engagement with suitably tapped portions of the base plate 52; and thus it will be understood that upon equal tightening of the screws 56 around the periphery of the apparatus the flange structure carrying the edge of the diaphragm will be pulled downwardly over the lip portion of the cuff 42 for tensioning of the diaphragm. Thus, any desired degree of tension in the diaphragm may be provided at will.

In Figures 8 and 9 the diaphragm 40 is supported centrally by means of a post 60 extending from the base plate 52, and a locking screw 62 is engaged through the diaphragm and the post 60 for locking the central portion of the diaphragm to the post. Thus, it will be understood that a plurality of work pieces as indicated in Fig. 8 may be mounted upon separate spindles spaced circularly of the diaphragm for simultaneous processing in accord with the method of the invention as explained hereinabove. The post 60 is rotatably mounted upon a base plate 64 and is operably connected at its lower end with a gear train indciated at 66 for providing rotation of the apparatus about the vertical axis of the post 60.

It will be appreciated that by reason of the plan view spacing of the respective work piece carrying spindles, as indicated in Fig. 7, the corresponding work pieces will be adapted to press downwardly into the diaphragm 40 so as to elastically deform the latter in the region of each work piece so as to provide uniform pressure contact between the diaphragm 40 and the entire lower face portion of each of the work pieces. Consequently, upon rotation of the diaphragm 40 about the axis of the central post 60 and simultaneous individual rotation of the respective work piece carrying spindles 14 and oscillation thereof in directions radially of the diaphragm, the acid controlling operation of the diaphragm relative to the work piece surfaces referred to hereinabove will be provided simultaneously in connection with a plurality of separate work pieces.

It is to be noted that a particular feature of the method of the invention relates to the fact that the diaphragm element of the apparatus is provided of extremely resilient and elastically deformable form, whereby the diaphragm is adapted to conform accurately to every surface portion of the work piece or work pieces being processed in any given instance. Thus, the stock pieces will be initially prepared so as to conform accurately to the prescribed final contour of the article to be produced, as by means of some relatively accurate grinding or molding or pressing process or the like; and that the subsequent processing thereof by means of the diaphragm controlled acid reaction will have no tendency to change the general contour of the work piece as previously provided, but will simply eliminate from the surface structure of the work piece all imperfections and local irregularities or the like such as are inevitably residual thereon as a result of initial stock piece shaping processes as by grinding or molding or pressing operations or the like. Consequently, the contour of the finished processed surface will be geometrically accurate as predetermined by the preliminary shaping of the stock piece, while the finished surface will have been provided by means of relatively few and inexpensive manufacturing steps so as to be locally perfectly regular and of improved form as explained hereinabove.

As explained hereinabove, the degree of wiping contact of the diaphragm relative to central and marginal edge zones of the stock piece in any given case may be varied and regulated at will by adjustment of the tension in the diaphragm and the degree of deformation of the diaphragm by the stock piece. Therefore, the degree of curvature of the finally processed surface may be controlled by adjustment of the diaphragm, and any inaccuracies of contour in the original stock piece corrected. It will also be understood that although only a limited number of forms of the invention have been shown and described in detail, it will be apparent to those skilled in the art that the invention is not so limited but that various changes may be made therein without departing from the spirit of the invention or the scope of the appended claims.

I claim:

1. An apparatus for processing curved surface portions of glass articles, comprising elastic diaphragm means and work piece carrying spindle means arranged to mount a work piece and to press the latter into slide bearing contact relation against said diaphragm so as to elastically deform the latter into uniform bearing contact relation against all adjacent surface portions of said work piece, and means for simultaneously rotating said spindle and oscillating the latter so as to slidably move said work piece relative to said diaphragm, and means for supplying the work piece contacting surface portion of said diaphragm with a glass-reactive acid solution.

2. An apparatus for processing curved surface portions of glass articles, comprising elastic diaphragm means and work piece carrying spindle means arranged to mount a work piece and to press the latter into slide bearing contact relation against said diaphragm so as to elastically deform the latter into uniform bearing contact relation against all adjacent surface portions of said work piece, and means for moving said work piece slidably relative to said diaphragm, and means for supplying the work piece contacting surface portion of said diaphragm with a glass-reactive acid solution.

3. An apparatus for processing curved surface portions of glass articles including an elastic diaphragm means and work piece carrying means arranged to press the latter into slide bearing contact relation against said diaphragm so as to elastically deform the latter into uniform bearing contact relation against all adjacent surface portions of said work piece, and means for simultaneously rotating and oscillating said work piece slidably relative to said diaphragm, and means for supplying the work piece contacting surface portion of said diaphragm with a glass-reactive acid solution.

4. An apparatus for processing variously curved surface portions of glass articles, comprising elastic diaphragm means and work piece carrying means arranged to mount a work piece and to adjustably press the latter into slide bearing contact relation against said diaphragm so as to elastically deform the latter into uniform bearing contact relation against all adjacent surface portions of said work piece, means for adjusting the tension of said diaphragm, and means for moving said work piece slidably relative to said diaphragm, and means for supplying the work piece contacting surface portion of said diaphragm with a glass-reactive acid solution.

5. An apparatus for processing curved surface portions of glass articles, comprising elastic diaphragm means and work piece carrying means arranged to mount a work piece and to press the latter into slide bearing contact relation against said diaphragm so as to elastically deform the latter into uniform bearing contact relation against all adjacent surface portions of said work piece, means for adjusting the tension of said diaphragm, and means for simultaneously rotating and oscillating said carrying means so as to move said work piece slidably relative to said diaphragm, and means for supplying the work piece contacting surface portion of said diaphragm with a glass-reactive acid solution.

6. An apparatus for processing variously curved surface portions of glass articles, comprising elastic diaphragm means and work piece carrying means arranged to mount a work piece and to press the latter into slide bearing contact relation against said diaphragm so as to elastically deform the latter into uniform bearing contact relation against all adjacent surface portions of said work piece, means for simultaneously rotating said spindle and oscillating the latter so as to move said work piece slidably relative to said diaphragm, and means for supplying the work piece contacting surface portion of said diaphragm with a glass-reactive acid solution, said diaphragm being mounted upon a support so as to extend across an apertured portion thereof, and means for shifting the support engaging portions of said diaphragm relative to said support for adjusting the tension forces within said diaphragm.

7. The method of processing curved surface portions of glass articles, comprising wiping an elastic diaphragm against a glass stock piece while pressing the latter into slide bearing contact relation against said diaphragm so as to elastically deform the latter into uniform bearing contact relation against all adjacent surface portions of said stock piece and while feeding the stock piece contacting surface portion of said diaphragm with a continuous supply of glass-reactive acid solution.

8. The method of processing a curved surface portion of a glass article, comprising pressing an elastic diaphragm against the glass stock piece while pressing the latter into slide bearing contact relation against said diaphragm so as to elastically deform the latter into uniform bearing contact relation against all adjacent surface portions of said work piece and simultaneously rotating and oscillating said stock piece relative to said diaphragm while supplying the work piece contacting surface portion of said diaphragm with a glass-reactive acid solution.

9. The method of processing a curved surface portion of a glass stock piece, comprising pressing an elastic diaphragm thereagainst into slide bearing contact relation so as to elastically deform the diaphragm into uniform bearing contact against all portions of said work piece surface to be processed while adjusting the tension forces within said diaphragm so as to fit the curve of the stock piece perfectly, and simultaneously moving said work piece slidably relative to said diaphragm while supplying the work piece contacting surface portion of said diaphragm with a glass-reactive acid solution.

10. An apparatus for processing variously curved surface portions of glass articles, comprising flexible diaphragm means and relatively oscillatable work piece carrying means arranged to mount a work piece and to oscillate said work piece while pressing it into slide bearing contact relation against said diaphragm so as to flexibly deform the latter into uniform bearing contact relation against all adjacent surface portions of said work piece throughout all stages of oscillation to process said glass surface portions in the presence of a glass-reactive acid means disposed upon said diaphragm.

11. An apparatus for processing variously curved surface portions of glass articles, comprising elastic diaphragm means and work piece carrying means arranged to mount a work piece and to adjustably press the latter into slide bearing contact relation against said diaphragm so as to elastically deform the latter, means for adjusting the tension of said diaphragm, and means for moving said work piece slidably relative to said diaphragm so as to bear with regulated pressures against different portions of said work piece, and means for supplying the work piece contacting surface portion of said diaphragm with a glass-reactive acid solution.

VICTOR WALKER.